United States Patent [19]
Wu et al.

[11] Patent Number: 6,157,938
[45] Date of Patent: Dec. 5, 2000

[54] FAST FOURIER TRANSFORM DEVICE WITH PARALLEL LATTICE ARCHITECTURE

[75] Inventors: An-Yeu Wu, Taipei; Tsun-Shan Chan, Changhua; Bor-Min Wang, Hsinchu, all of Taiwan

[73] Assignee: Industrial Technology Research Institute, Hsin-Chu Hsien, Taiwan

[21] Appl. No.: 09/150,964

[22] Filed: Sep. 10, 1998

[30] Foreign Application Priority Data

May 28, 1998 [TW] Taiwan .................................. 87108356

[51] Int. Cl.[7] ...................................................... G06F 15/00
[52] U.S. Cl. .............................................................. 708/404
[58] Field of Search ..................................... 708/400–409

[56] References Cited

U.S. PATENT DOCUMENTS

| 4,932,062 | 6/1990 | Hamilton ................................ 704/233 |
| 5,633,817 | 5/1997 | Verhenne et al. ....................... 708/404 |
| 5,991,787 | 11/1999 | Abel et al. .............................. 708/400 |

OTHER PUBLICATIONS

Guo, et al., "The Quick Fourier Transform: An FFT Based on Symmetries", *IEEE Transactions on Signal Processing*, vol. 46, No. 2, Feb. 1992, p. 335–341.

Cariolaro, et al., "An OFDM Scheme with a Half Complexity", *IEEE Journal on Selected Areas in Communications*, vol. 13, No. 9, Dec.1995, p. 1586–1599.

Wu, et al., "Orthogonal Frequency Division Multiplexing: A Multi–Carrier Modulation Scheme", *IEEE Transactions on Consumer Electronics*, vol. 41, No. 3, Aug. 1995, p. 392–399.

Zou, et al., "COFDM: An Overview", *IEEE Transactions on Broadcasting*, vol. 41, No. 1, Mar. 1995, p. 1–8.

Wu, et al., "Algorithm–Based Low–Power Transform Coding Architectures", *IEEE ICASSP '95*, pp. 3267–3270.

Liu, et al., "Optimal Unified Architectures for the Real-Time Computation of Time–Recursive Discrete Sinusoidal Transforms", *IEEE Transactions on Circuits and Systems for Video Technology*, p. 168–180 vol. 4, No. 2, Apr. 1994.

Daneshrad, et al., "A 1.6 Mbps Digital–QAM System for DSL Transmission", *IEEE Journal on Selected Areas in Communications*, p. 1600–1610, vol. 13, No. 9, Dec. 1995.

Sistanizadeh, et al., Mult–Tone Transmission for Asymmetric Digital Subscriber Lines (ADSL), *IEEE*, 1993, p. 756–760.

Chow, et al., A Discrete Multitone Transceiver System for HDSL Applications, *IEEE Journal on Selected Areas in Communications*, vol. 9, No. 6, Aug. 1991, p. 895–908.

Im, et al., "51.84 M/bs 16–CAP ATM AN Standard", *IEEE Journal on Selected Areas in Communications*, vol. 13, No. 4, May 1995, p. 620–632.

A.V. Oppenheim and R.W. Schafer, "Computation of the Discrete Fourier Transform," *Discrete–Time Signal Processing*, Chapter 9 pp. 586–605, Englewood Cliffs. New Jersey: Prentice–Hall 1989.

*Primary Examiner*—Chuong Dinh Ngo
*Attorney, Agent, or Firm*—Ladas & Parry

[57] ABSTRACT

A Fast Fourier Transform device of a discrete multitone modulation system can be implemented by very large scale integrated (VLSI) architecture. The I-FFT/F-FFT functions are modified to avoid complex-valued operations. A time recursive parallel lattice structure is used to reduce the complexity in hardware requirement for the I-FFT/F-FFT.

12 Claims, 5 Drawing Sheets

FAST FOURIER TRANSFORM DEVICE WITH PARALLEL LATTICE ARCHITECTURE

BACKGROUND OF THE INVENTION

1. Field of the Invention

The present invention relates to a discrete multitone transmission technology and, more particularly, to a Fast Fourier Transform device for a discrete multitone system, wherein the Fast Fourier Transform device is realized with a parallel lattice architecture by simplifying the demand for multipliers and adders through conjugate symmetry to further reduce manufacturing cost.

2. Description of the Prior Art

The recent progress of Internet access has led to the urgent demand for high-speed data transmission technology. Various multiple modulation/demodulation circuits, such as carrierless-amplitude-phase (CAP), discrete multitone modulation (DMT), quadrature amplitude modulation (QAM) technologies, have been proposed to break through the transmission bottleneck of twisted-pair phone lines. Among these advanced modulation schemes, the DMT can achieve highest transmission rate since it incorporates lots of advanced DSP techniques, such as dynamic bit allocation, multi-dimensional tone encoding, frequency-domain equalization, etc. As a consequence, the ADSL (asymmetric digital subscriber lines) standard committee has chosen the DMT as the physical-layer transmission standard.

In a conventional DMT system, Fast Fourier Transform (FFT) algorithm is basically adopted. However, Fast Fourier Transform is a reversible operation, which includes Forward Fast Fourier Transform, hereinafter F-FFT, and Inverse Fast Fourier Transform, hereinafter I-FFT. Therefore, the term "Fast Fourier Transform" as used in the following description includes both F-FFT and I-FFT, unless otherwise specified.

The Fast Fourier Transform device as embodied in a discrete multitone system of prior art is commonly realized with a butterfly structure formed with Fast Fourier Transform algorithm of decimation-in-time and decimation-in-frequency. Such a butterfly structure will require (6Nlog$_2$2N) real adders and (4Nlog$_2$2N) real multipliers for 2N-point Fast Fourier Transform device. Taking 512 (N=256) points for example, 13824 adders and 9216 multipliers will be needed. Hence, such a large demand for hardware components will increase the complexity of wiring and the required layout area, and it will become difficult for very large scale integrated (VLSI) circuit implementation due to increasing manufacturing cost.

SUMMARY OF THE INVENTION

Accordingly, it is an object of this invention to provide a Fast Fourier Transform device constituted with a time-recursive approach to reduce the computational complexity and thus eliminate complex operators by taking advantage of data symmetry so as to save the total hardware complexity.

It is another object of this invention to provide a Fast Fourier Transform device constituted with a parallel lattice architecture to make the entire structure more regular and modular and to simplify the complexity of wiring suitable for VLSI implementation.

To achieve the foregoing objects, this invention can be realized with a Fast Fourier Transform device. The Fast Fourier Transform device of the present invention includes an Inverse Fast Fourier Transform module and a Forward Fast Fourier Transform module. The Inverse Fast Fourier Transform converts x(n)s (n=0, 1, . . . , N-1) into X(k)s (k=0, 1, . . . , 2N-1), the x(n)s are inputted into said Inverse Fast Fourier Transform module by the real part $x_r$(n)s and imaginary part $x_i$(n)s, respectively, the Inverse Fast Fourier Transform module calculate their corresponding MDCT(k) function and MDST(k)function, adds them up and then output them, wherein, $$MDCT(k) = \sum_{n=0}^{N-1} x_r(n)\cos\frac{2\pi nk}{2N},$$

and $$MDST(k) = \sum_{n=0}^{N-1} x_i(n)\sin\frac{2\pi nk}{2N};$$

FFT module is provided for receiving the X(k)s and calculating the corresponding MDCT(n) and MDST(n) function, combining the results outputting the corresponding x(n)s, wherein, $$MDCT(n) = \sum_{k=0}^{2N-1} X(k)\cos\frac{2\pi nk}{2N},$$

and $$MDST(n) = \sum_{k=0}^{2N-1} X(k)\sin\frac{2\pi nk}{2N}.$$

BRIEF DESCRIPTION OF THE DRAWINGS

The objects, features and advantages of this invention will be more clearly understood from the following detailed description taken in conjunction with the accompanying drawings in which.

DESCRIPTION OF THE PREFERRED EMBODIMENT

Figure 1:
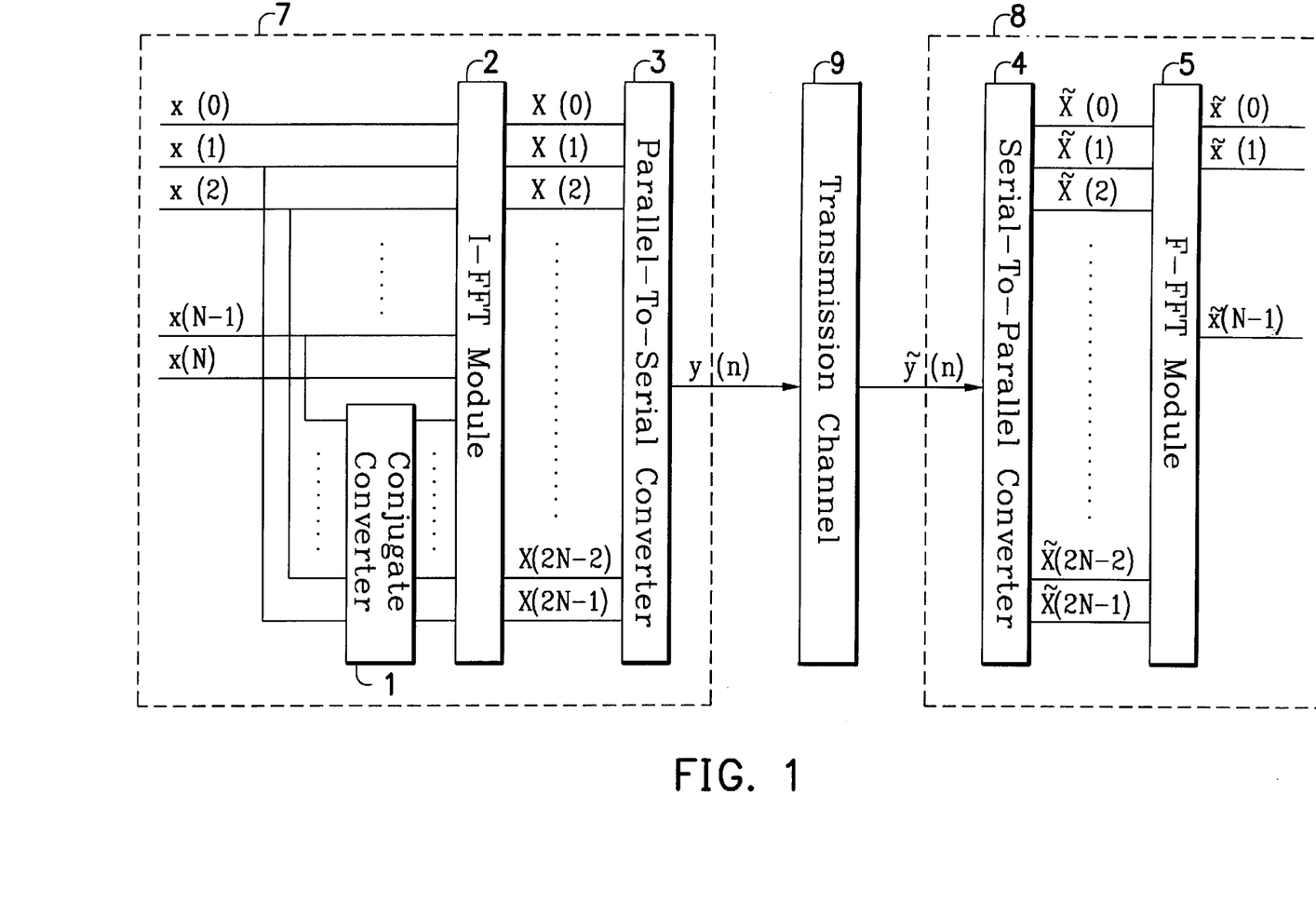
FIG. 1 is a block diagram showing the Fast Fourier Transform device in the DMT system according to the present invention.

FIG. 1 is a diagram showing the Fast Fourier Transform device in the DMT system according to the present invention. Modulator 7 transmits signals to demodulator 8 through transmission channel 9. Modulator 7 includes a conjugate converter 1, I-FFT module 2, and parallel-to-serial converter 3. Receiving terminal 8 includes serial-to-parallel converter 4 and F-FFT module 5. If the data to be processed by I-FFT module 2 are of 2N points, then the F-FFT module 5 is the converting module for processing the 2N points data.

In the modulator 7, the data of x(0), x(1), x(2), . . . , x(N−1), x(N) are inputted into the I-FFT module 2, wherein the data of x(0), x(1), x(2), ..., x(N−1) are further converted by the conjugate converter 1 into corresponding conjugate data of x(0)*, x(1)*, x(2)*, ..., x(N−1)* and forwarded as the input data to the I-FFT module 2. The data of X(0), X(1), X(2), ..., X(2N−2), X(2N−1) are the output data converted by the I-FFT module 2 and processed by the parallel-to-serial converter 3 as output signal y(n).

In the demodulator 8, the serial-to-parallel converter 4 receives signal y(n) and processes into data $\tilde{X}(0)$, $\tilde{X}(1)$, $\tilde{X}\times(2)$, ..., $\tilde{X}(2N-2)$, $\tilde{X}(2N-1)$, which are then inputted into the F-FFT module 5 for converting into $\tilde{x}(0)$, $\tilde{x}(1)$, $\tilde{x}(2)$, ..., $\tilde{x}(N-1)$ for output. All signals processed by the demodulator 8 are added with a symbol ~ to denote possible noise or interference during transmission through the transmission channel 9. Therefore, the received signals with noise or interference component are added with "~" to differ from the original signals.

Since only the Fast Fourier Transform device is specified in this invention, the modulator 7 as shown in FIG. 1, for simplicity, does not include units such as bit allocation of the DMT system, TCM encoder, constellation encoder, cyclic prefix, digital/analog converter. Similarly, bit re-allocation, TCM decoder, constellation decoder, remove cyclic prefix, analog/digital converter contained in the demodulator 8 are not shown in the drawing.

Parallel Lattice Structure of the I-FFT Module

In accordance with this invention, the data inputted to the I-FFT module 2 have the following restriction so the I-FFT module 2 may only output in real number:

$$x(n)=x^*(2N-n), \text{ for } n=0, 1, \ldots, N-1 \quad (1)$$

where x(n) including the real part and imaginary section is $x(n)=x_r(n)+jx_i(n)$, wherein $x(0)=x(N)=0$. The series of data of 2N in length after I-FFT is represented as:

$$X(k) = \sum_{N=0}^{2N-1} x(n)W_{2N}^{nk}, \text{ for } k = 0, 1, \ldots, 2N-1 \quad (2)$$

where, $$W_{2N}^{nk} \triangleq \exp\left(-j\frac{2\pi nk}{2N}\right).$$

X(k) of equation (2) can be divided into two parts:

$$X(k) = \sum_{n=0}^{N-1} x(n)W_{2N}^{nk} + \sum_{n=N}^{2N-1} x(n)W_{2N}^{nk} \quad (3)$$

Next, equation (2) can be simplified as follows by making use of the conjugate symmetrical properties of the input data:

$$X(k) = 2\left[\sum_{n=0}^{N-1} x_r(n)\cos\frac{2\pi nk}{2N} + \sum_{n=0}^{N-1} x_i(n)\sin\frac{2\pi nk}{2N}\right] \quad (4)$$

$$= 2[MDCT(k) + MDST(k)]$$

It can be determined from equation (4) that Fast Fourier Transform calculations include two-part operations of real numbers, where the first part is a discrete cosine transform-like operation with $x_r(n)$ (wherein n=0, 1, ..., N−1) as input. Whereas the second part is a discrete sine transform-like operation with $x_i(n)$ (wherein n=0, 1, ..., N−1) as input. For simplicity, the first part of equation (4) is defined as a modified discrete cosine transform (MDCT) function and the second part as a modified sine transform (MDST) function. Moreover, MDCT function and MDST function demonstrate the following characteristics:

$$MDCT(k)=MDCT(2N-k)$$

$$MDST(k)=-MDST(2N-k) \quad (5)$$

Consequently, the calculation with I-FFT can be focused on the calculations of MDCT(k) function and MDST(k) function in k=0, 1, ..., N−1. Then the calculations of MDCT(k) function and MDST(k) function in k=N+1, ..., 2N−1 are expanded based upon equation (5), except for k=N, which requires special processing. In this manner, the hardware complexity is reduced by 50%.

Figure 2:
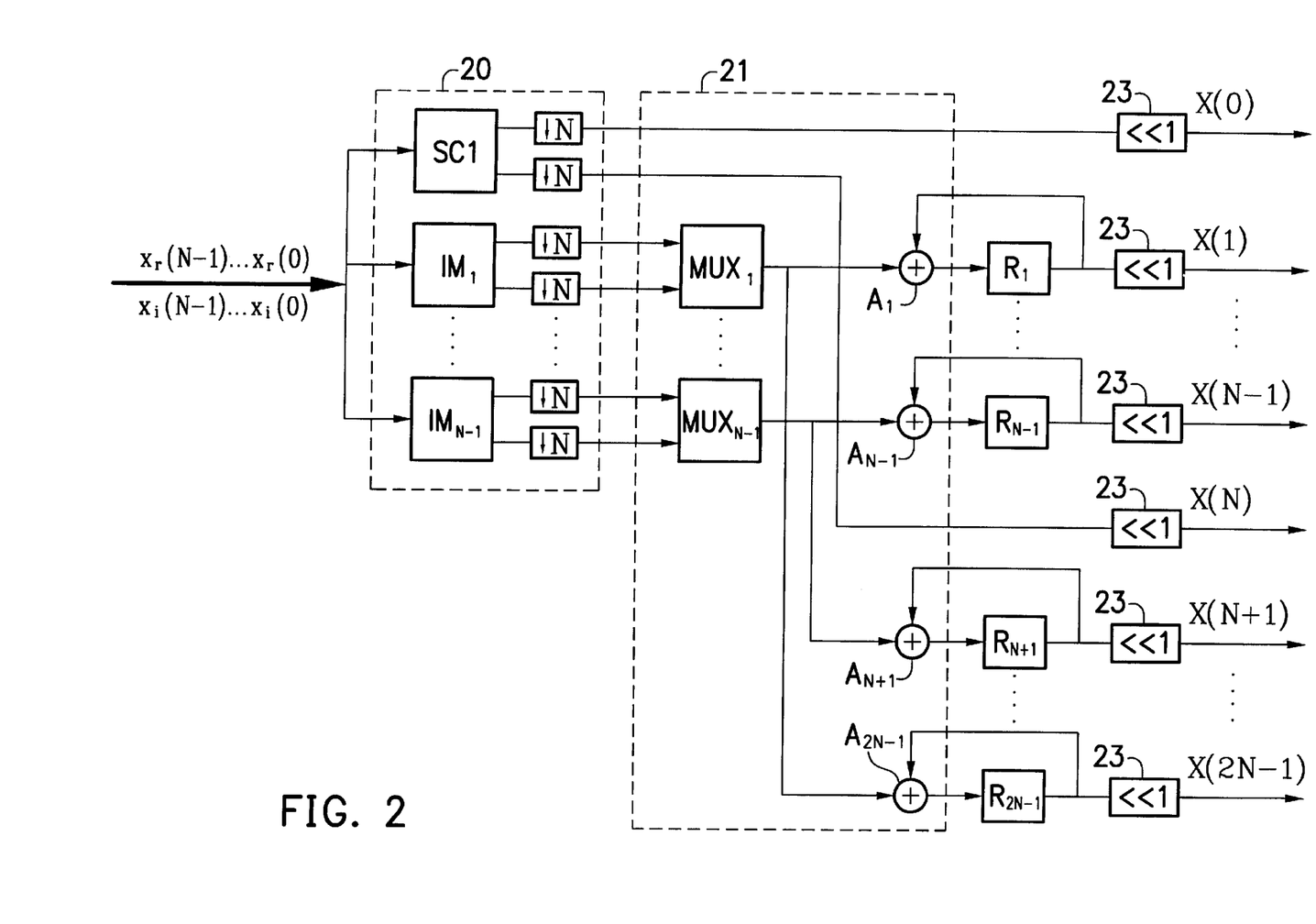
FIG. 2 is a diagram showing the structure of an I-FFT module of FIG. 1.

Refer to FIG. 2, the structure of I-FFT module 2 of FIG. 1 is shown. The I-FFT module 2 is a 2N-point transform module which includes a first MDCT/MDST module array 20, an expanding circuit 21, 2(N−1) R type registers $R_1 \sim R_{N-1}$ and $R_{N+1} \sim R_{2N-1}$, and (2N) left shift registers 23.

The first MDCT/MDST module array 20 is for receiving data x(n) and performs calculations of the MDCT function and MDST function to output the calculated outcome. Since MDCT/MDST module array 20 focuses only on the calculations of MDCT(k) function and MDST(k) function in k=0, 1, ..., N−1 due to the features shown in equation (5), the expanding circuit 21 extends the MDCT(k) function and MDST(k) function to the calculations for k=N, N+1, ..., 2N−1. Further, the expanding circuit 21 performs multiplexing from the calculated outcomes of MDCT(k) ($x_r(n)$ as input) and MDST(k) ($x_i(n)$ as input) as consecutive output options. For example, the result of MDCT(k) ($x_r(n)$ as input) can first be outputted for storing in the corresponding R type registers $R_1 - R_{N-1}$ and $R_{N+1} - R_{2N+1}$, and then adding up in the expanding circuit 21 with the result of MDST(k) ($x_i(n)$ as input) outputted later. Since equation (4) further includes multiplication 2, so the data outputted from the expanding circuit 21 will be shifted left by one bit by the corresponding left shift register 23 for outputting data X(0), X(1), X(2), ..., X(2N−2), X(2N−1).

Refer again to FIG. 2, the first MDCT/MDST module array 20 comprises (N−1) lattice modules $IM_1$ $IM_{N-1}$ and a specific module SC1 for receiving input data x(n). Since each x(n) includes a real part $x_r(n)$ and an imaginary part $x_i(n)$, according to equations (4) and (5), the present invention performs calculations of MDCT(k) function and MDST(k) function, and $x_r(n)$ and $x_i(n)$ are inputted to the MDCT/MDST module array 20, respectively. For example, $x_r(n)$ (n=0, 1, ..., N−1) can first be inputted to the first MDCT/MDST module array 20 for calculating the result of the MDCT section and then $x_i(n)$ (n=0, 1, ..., N−1) is inputted to the first MDCT/MDST module array 20 for calculating the result of the MDST section. In FIG. 2, lattice modules $IM_1$ to $IM_{N-1}$ have two output terminals for outputting MDCT(k) and MDST(k), respectively. For example, the two terminals of IM1 output MDCT(1) and MDST(1) respectively, and the two terminals of IM2 output MDCT(2) and MDST(2) respectively. Similarly, the two terminals of $IM_{N-1}$ output MDCT(N−1) and MDST(N−1) respectively. In particular, from equation (4), X(0) and X(N) can be simplified as follows:

$$X(0) = 2MDCT(0) = 2\sum_{n=0}^{N-1} x_r(n) \qquad (6)$$

$$X(N) = MDCT(N) = 2\sum_{n=0}^{N-1} (-1)^n x_r(n)$$

and therefore can be outputted respectively from the two terminals of the special module SC1. In FIG. 2, each lattice module and the special module SC1 are attached with a block $\downarrow N$ to denote that we pick up the MDCT/MDST results at the time $x_r(N-1)$ and $x_f(N-1)$ finish the updating in the mudule array 20.

Expanding circuit 21 comprises (N−1) multiplexers $MUX_1 \sim MUX_{N+1}$ and 2(N−1) adders $A_1 \sim A_{N-1}$ and $A_{N+1} \sim A_{2N-1}$, multiplexers $MUX_1 \sim MUX_{N+1}$ are for receiving the output data from lattice module $IM_1$ to $IM_{N+1}$, respectively. For example, the multiplexer $MUX_1$ receives the output data MDCT(1) and MDST(1) of the lattice module $IM_1$. Similarly, the multiplexer $MUX_{N-1}$ receives the output data MDCT(N−1) and MDST(N−1) of the lattice module $IM_{N-1}$. The output terminals of multiplexers $MUX_1$ to $MUX_{N-1}$ connect to adders $A_1$ to $A_{N-1}$, respectively. Adders $A_1$ to $A_{N-1}$ connect to R type registers $R_1$ to $R_{N-1}$. Since the first MDCT/MDST module array 20 focuses only on the calculations of MDCT(k) function and MDST(k) function in k=0, 1, . . . , N−1, according to the feature demonstrated by equation (5), the expanding circuit 21 extends the calculations of MDCT(k) function and MDST (k) function in k=N, N+1, . . . , 2N−1. Hence, the output terminals of multiplexers $MUX_1$ to $MUX_{N-1}$ further connect to adders $A_{2N-1}$ to $A_{N+1}$, with adders $A_{N+1}$ to $A_{2N-1}$ connecting to R type registers $R_1$ to $R_{N-1}$, respectively.

Multiplexers $MUX_1$ to $MUX_{N-1}$ multiplexing options for sequential outputs of the calculated MDCT and MDST results, as described above, if $x_r(n)(n=0, 1, \ldots, N-1)$ is first inputted to the first MDCT/MDST module array 20 for calculating the result of MDCT section and $x_r(n)(n=0, 1, \ldots, N-1)$ is inputted further to the first MDCT/MDST module array 20 for calculating the result of MDST section, then multiplexers $MUX_1$ to $MUX_{N-1}$ can choose through adders $A_1$ to $A_{N-1}$ to first save MDCT result in the corresponding R type registers $R_1$ to $R_{N-1}$ to $R_{2N-1}$, and then multiplexers $MUX_1$ to $MUX_{N-1}$ choose to add up the MDST result in the corresponding adders $A_1$ to $A_{N-1}$ and $A_{N+1}$ to $A_{2n-1}$ with the MDCT result stored previously in corresponding R type register $R_1$ to $R_{N-1}$ $R_{N+1}$ to $R_{2N-1}$. Since the special module SC1 can output MDCT(0) and MDST(N) directly, it therefore can connect to the corresponding shift registers 23 directly.

To realize lattice modules $IM_1$ to $IM_{N-1}$, this invention adopts the time recursive technology as shown in K. J. Ray Liu, et al., "Optimal unified architectures for the real-time computation of time-recursive discrete sinusoidal transform," *IEEE Trans. Circuits and Systems for Video Technology*, Vol. 4, No. 2, pp. 168–180, April 1994. First, data are sequentially inputted from $x_r(t)$ to $x_r(t+N-1)$ and the MDCT function is defined as:

$$X_c(k, t) = \sum_{n=t}^{t+N-1} x_r(n) \cos \frac{2\pi(n-t)k}{2N} \text{ for } k = 0, 1, \ldots, N-1 \qquad (7)$$

When the new data $x_r(t+N)$ arrived, then the MDCT function is updated as:

$$X_c(k, t+1) = \sum_{n=t+1}^{t+N} x_r(n) \cos \frac{2\pi(n-t-1)k}{2N} \qquad (8)$$

for $k = 0, 1, \ldots, N-1$

Equation (8) can be rewritten as:

$$X_c(k, t+1) = \overline{X}_c(k, t+1)\cos\frac{\pi k}{N} + \overline{X}_s(k, t+1)\sin\frac{\pi k}{N} \qquad (9)$$

where $$\overline{X}_c(k, t+1) \triangleq \sum_{n=t+1}^{t+N} x_r(n)\cos\frac{2\pi(n-t)k}{2N} \qquad (10)$$

and $$\overline{X}_s(k, t+1) \triangleq \sum_{n=t+1}^{t+N} x_r(n)\sin\frac{2\pi(n-t)k}{2N} \qquad (11)$$

The relationship between $\overline{X}_c(k, t+1)$ and $X_c(k, t)$ can be obtained by comparing equations (7) and (10) as follows:

$$\overline{X}_c(k, t+1) = X_c(k, t) - x_r(t) + (-1)^k x_r(t+N) \qquad (12)$$

Since the initial condition is zero, so $x_r(t)=0$. Therefore, $\overline{X}_c(k, t+1)$ can be simplified as:

$$\overline{X}_c(k, t+1) = X_c(k, t) + (-1)^k x_r(t+N) \qquad (13)$$

For the same reason, the relationship between $\overline{X}_s(k, t+1)$ and $X_s(k, t)$ can be obtained as follows:

$$\overline{X}_s(k, t+1) = X_s(k, t) \qquad (14)$$

Figure 3:
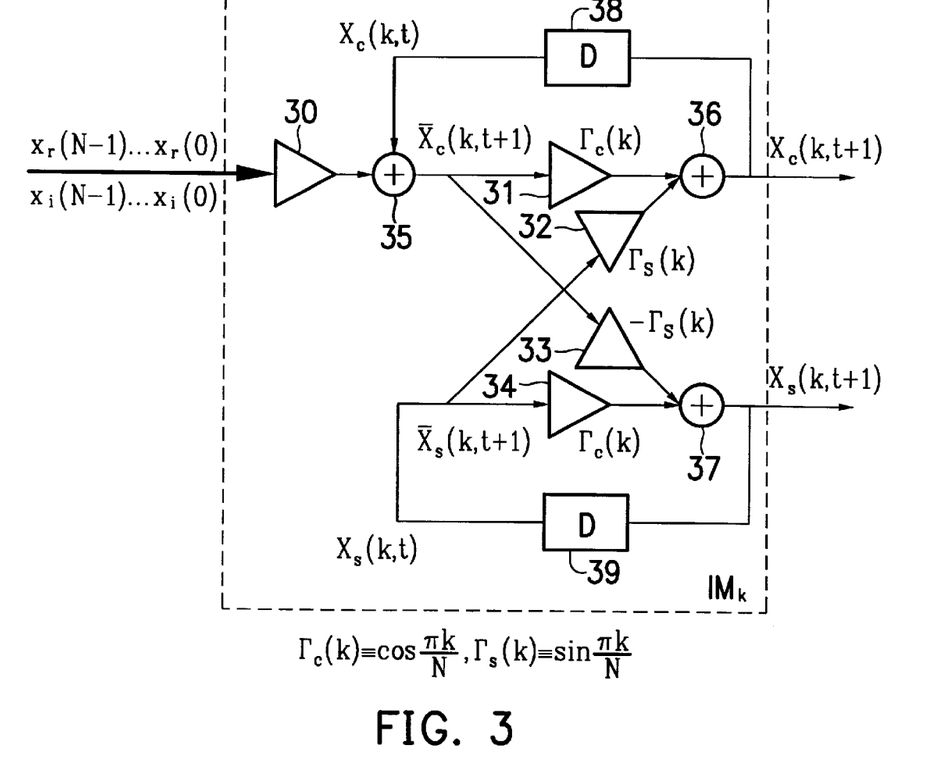
FIG. 3 is a detailed circuit diagram showing the lattice module IM$_k$ of FIG. 2.

Consequently, each lattice module of $IM_1$ to $IM_{N-1}$ can be realized with the circuit as shown in FIG. 3 according to equations (9), (13) and (14).

FIG. 3 is a circuit diagram showing the lattice module $IM_k$ (k=1, 2, . . . , N−1), said lattice module $IM_k$ includes: a symbol converter 30, four multipliers 31 to 34, three adders 35 to 37 and two delays 38 to 39. The symbol converter 30 receives $x_r(n)$, which is then multiplied with $(31\ 1)^k$ and forwarded to the adders 35 for adding up with $X_c(k, t)$ to yield a sum $\overline{X}_c(k, t+1)$. $\overline{X}_c(k, t+1)$ is supplied to the multipliers 31 and 33 for performing multiplication with $\Gamma_c(k)$ and $-\Gamma_s(k)$, respectively, and supplied to the adders 36 and 37, where $\Gamma_c(k)=\cos(\pi k/N)$ and $\Gamma_s(k)=\sin(\pi k/N)$. The output of adder 36 is connected to the delay 38, the output of the delay 38 is $X_c(k, t)$. The output of adder 37 is connected to the delay 39, the output of the delay 39 is $X_s(k, t)$, and $X_s(k, t)$ is $\overline{X}_s(k, t+1)$(as show in equation (14)). $\overline{X}_s(k, t+1)$ is supplied to the multipliers 34 and 32 for performing multiplication with $\Gamma_c(k)$ and $\Gamma_s(k)$, respectively, and supplied to the adders 37 and 36. The output to the adder 36 for retrieval when $x_r(N-1)$ finishes the updating is the result of MDCT(k).

Further, consider the MDST function as:

$$X_s(k, t) = \sum_{n=t}^{t+N-1} x_i(n)\sin\frac{2\pi(n-t)k}{2N} \quad (15)$$

for k=0, 1, ..., N−1
It can be obtained from the calculations according to the equations (8) to (11):

$$X_s(k, t+1) = \overline{X}_s(k, t+1)\cos\frac{\pi k}{N} - \overline{X}_c(k, t+1)\sin\frac{\pi k}{N} \quad (16)$$

where $$\overline{X}_c(k, t+1) \triangleq \sum_{n=t+1}^{t+N} x_i(n)\cos\frac{2\pi(n-t)k}{2N} \quad (17)$$

and $$\overline{X}_s(k, t+1) \triangleq \sum_{n=t+1}^{t+N} x_i(n)\sin\frac{2\pi(n-t)k}{2N} \quad (18)$$

Equations (17) and (18) are similar to equations (10) and (11). Except for that $x_i(n)$ is received by the symbol converter 30, it can be realized with the lattice module $IM_k$ circuit as shown in FIG. 3 that the output to the adder 37 being retrieved when $x_i(N-1)$ finishes updating is the outcome of MDST(k).

Figure 4:
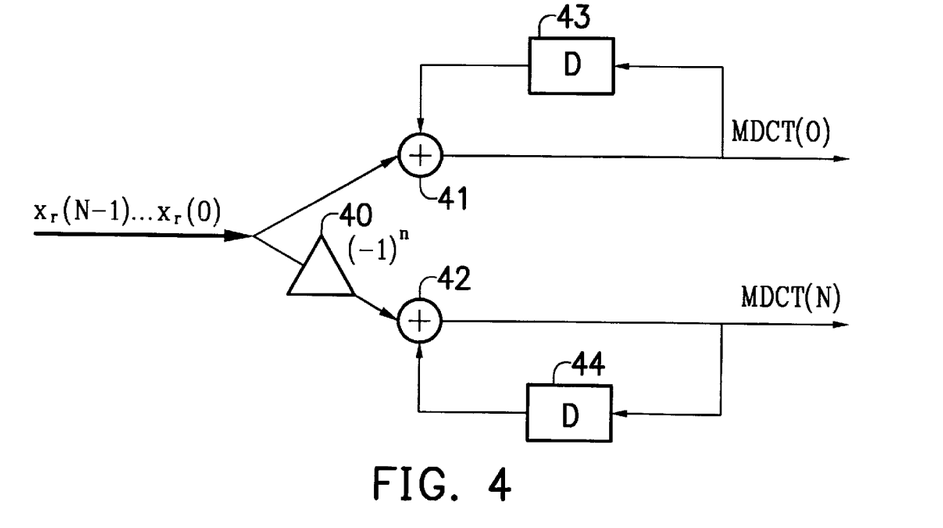
FIG. 4 is a detailed circuit diagram showing the special module SC1 of FIG. 2.

However, since the calculations of X(0) and X(N) can be simplified as equation (6), the special module SC1 circuit is as shown in FIG. 4. The special module SC1 comprises a symbol converter 40, two adders 41 and 42, and two delays 44 and 45. It can be known from equation (6) that the calculations of MDCT(0) and MDCT(N) only require $x_r(n)$, therefore, $x_r(0), x_r(1), \ldots, x_r(N-1)$ are sequentially supplied to the adder 41 by feeding the output of the adder 41 to the delay 43 for adding $x_r(0), x_1(1), \ldots, x_r(N-1)$ up sequentially and outputting the calculated outcome of MDCT(0). And the symbol converter 40 multiplies $x_r(0), x_1(1), \ldots, x_r(N-1)$ with $(-1)^k$ and supplies to the adder 42 by feeding the output of adder 42 to the delay 44 for adding $x_r(0), -x_1(1), \ldots, (-1)^{N-1}X_r(N-1)$ up sequentially and outputting the calculated outcome of MDCT(N).

Parallel Lattice Structure of F-FFT Module

In the demodulator 8, the received signals are demodulated with the F-FFT module 5, namely:

$$\tilde{x}(n) = \frac{1}{2N}\sum_{k=0}^{2N-1} \tilde{x}(k)W_{2N}^{-nk} \quad (19)$$

Since $\tilde{X}(k)(k=0, 1, \ldots, 2N-1)$ are real numbers, so equation (19) can be rewritten as:

$$\tilde{x}(n) = \frac{1}{2N}\left[\sum_{k=0}^{2N-1} \tilde{X}(k)\cos 2\pi\frac{nk}{2N} + j\sum_{k=0}^{2N-1} X(k)\sin 2\pi\frac{nk}{2N}\right] \quad (20)$$

$$= \frac{1}{2N}[MDCT(n) + jMDST(n)]$$

It can be known from equation (20) that the F-FFT can be divided into a two-part calculation of MDCT and MDST, and can be realized by adopting two real-number circuits (for calculating MDCT function and MDST function) in joint quantitative calculation of dividing with (½N).

Therefore, the F-FFT of the invention has nothing to do with complex-valued calculations. Besides, in a DMT system, the data at points n=N, N+1, ..., 2N−1 form a conjugate symmetry with the data at points n=0, 1, ..., N−1, therefore, focus can be placed only on the calculation of point data n=0, 1, ..., N−1 and the calculation of point data n=N, N+1, ..., 2N−1 can be omitted. This practice will reduce hardware complexity by an additional 50%.

Figure 5:
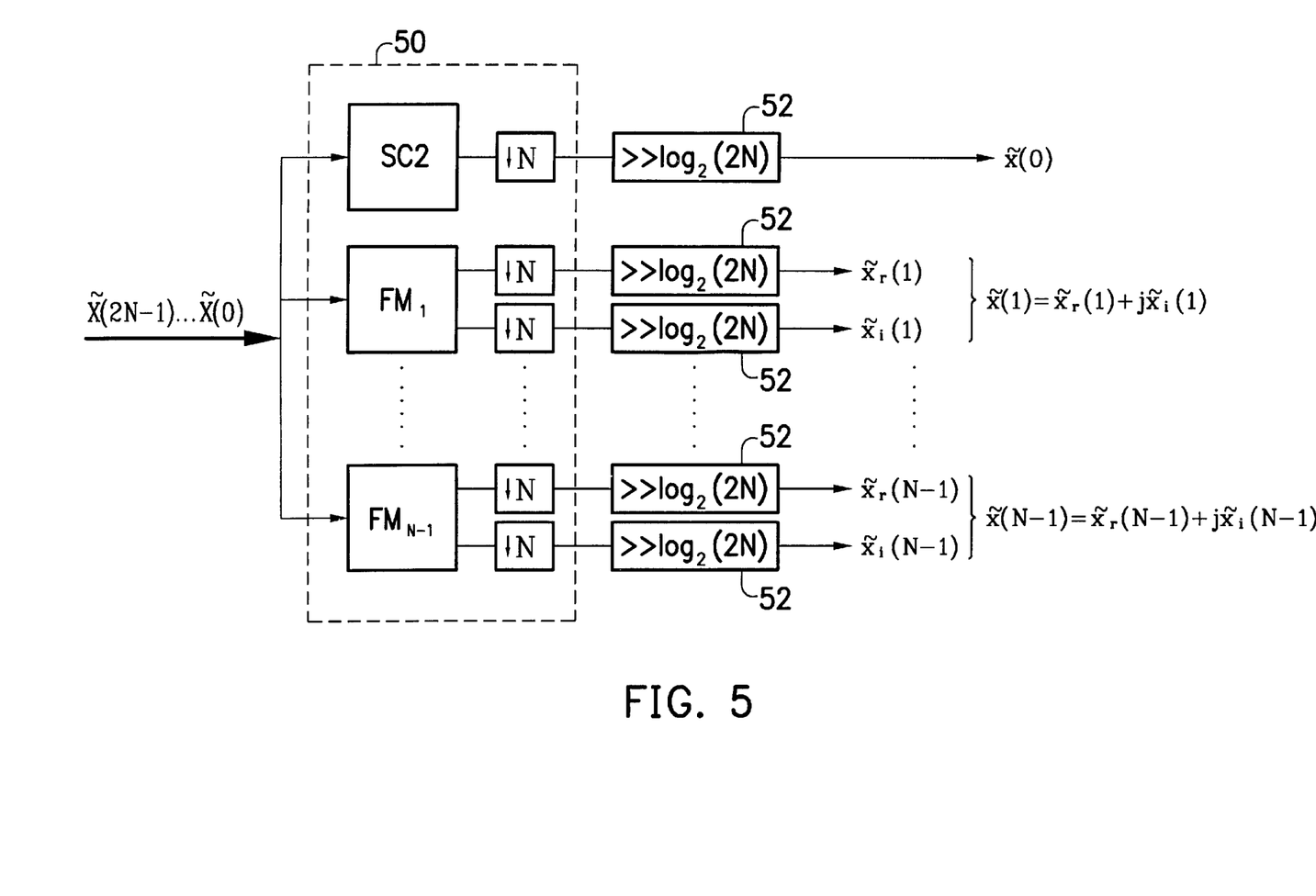
FIG. 5 is a diagram showing the architecture of a F-FFT module of FIG. 1.

Refer to FIG. 5, the architecture of the F-FFT module 5 of FIG. 1 is illustrated. In FIG. 5, the F-FFT module 5 is a 2N-point converting module which includes a second MDCT/MDST module array 50 and (2N−1) right shift registers. The second MDCT/MDST module array 50 is for receiving data $\tilde{x}(0), \tilde{x}(1), \ldots, \tilde{x}(2N-1)$ and for calculating MDCT and MDST. The Right shift register 52 shifts each data item $\log_2(2N)$ bits to the right for the data outputted from the second MDCT/MDST module 50, performs quantitative calculation by dividing by (½N) with equation (20), and outputs data $\tilde{x}(0), \tilde{x}_r(1), \tilde{x}_i(1), \ldots, \tilde{x}_r(N-1), \tilde{x}_i(N-1)$, $\tilde{x}(n)$ only needs to combine the corresponding real part and imaginary part with $(\tilde{x}_r(n)+j\tilde{x}_i(n))$.

Figure 6:
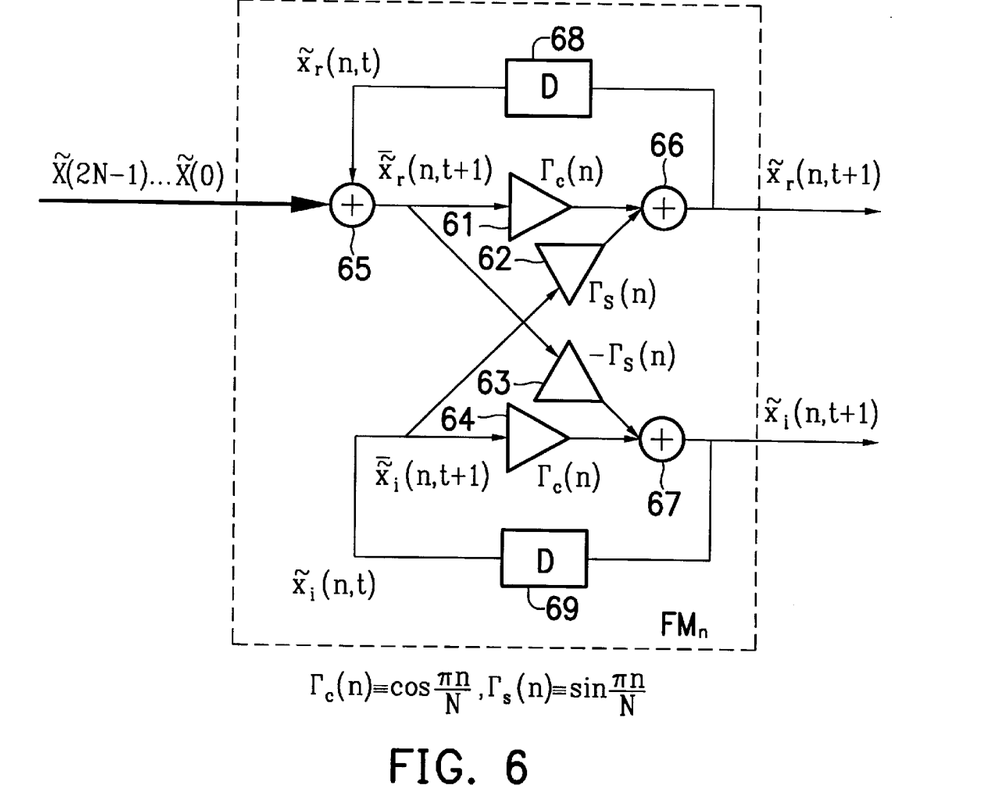
FIG. 6 is a detailed circuit diagram showing the lattice module FM$_n$ of FIG. 5.

Refer again FIG. 5, the second MDCT/MDST module array 50 includes (N−1) lattice modules $FM_1$ to $FM_{N-1}$ and a special module SC2 for receiving input data $\tilde{X}(k)(k=0, 1, \ldots, 2N-1)$. In FIG. 6, each of the lattice modules $FM_1$ to $FM_{N-1}$ have two output terminals for outputting MDCT(n) and MDST(n), respectively. For example, the two output terminals of $FM_1$ output MDCT(1) and MDST (1), respectively, and the two output terminals of $FM_2$ output MDCT(2) and MDST (2), respectively. Similarly, the two output terminals of $FM_{N-1}$ output MDCT(N−1) and MDST (N−1), respectively. With equation (20) $\tilde{x}(0)$ can be simplified as the following equation:

$$\tilde{x}(0) = \frac{1}{2N}MDCT(0) = \frac{1}{2N}\sum_{k=0}^{2N-1}\tilde{x}(k) \quad (21)$$

So the output can be outputted from the output of the special module SC2.

To realize lattice module $FM_1$ to $FM_{N-1}$, the time-recursive equation of MDCT, same as the calculations in equation (7) to (11), is:

$$\tilde{x}_r(n, t+1) = \overline{\tilde{x}}_r(n, t+1)\cos\pi\frac{n}{N} + \overline{\tilde{x}}_i(n, t+1)\sin\pi\frac{n}{N} \quad (22)$$

Likewise, the time-recursive equation of MDST is:

$$\tilde{x}_i(n, t+1) = \overline{\tilde{x}}_i(n, t+1)\cos\pi\frac{n}{N} - \overline{\tilde{x}}_r(n, t+1)\sin\pi\frac{n}{N} \quad (23)$$

where $$\overline{\tilde{x}}_r(n, t+1) \triangleq \sum_{k=t+1}^{t+2N} \tilde{X}(k)\cos 2\pi\frac{n(k-t)}{2N} \quad (24)$$

and $$\overline{\tilde{x}}_i(n, t+1) \triangleq \sum_{k=t+1}^{t+2N} \tilde{X}(k)\sin 2\pi\frac{n(k-t)}{2N} \quad (25)$$

The two are the auxiliary MDCT and auxiliary MDST of the F-FFT module 5. Similar to equations (12) and (13), the updating equations can be obtained for $\tilde{x}_r(n,t+1)$ and $\tilde{x}_i(n,t+1)$ as follows:

$$\tilde{x}_r(n,t+1) = \tilde{x}_4(n,t) + \tilde{X}(t+2N) \tag{26}$$

and $$\tilde{x}_i(n,t+1) = \tilde{x}_i(n,t) \tag{27}$$

So each of the lattice modules $FM_1$ to $FM_{N-1}$ can be realized with the circuit as shown in FIG. 6.

FIG. 6 is a detailed circuit diagram showing the lattice modules $FM_n$ (n=1, 2, ..., N−1), the lattice module $FM_n$ includes: four multipliers 61 to 64, three adders 65 to 67, and two delays 68 to 69. The adder 65 receives $\tilde{X}$ (k) and adds up with $\tilde{x}_r(n,t)$ to yield $\tilde{x}_r(n,t+1)$. Said $\tilde{x}_r(n,t+1)$ is supplied to the multipliers 61 and 63, respectively, for multiplying with $\Gamma_c(n)$ and $-\Gamma_s(n)$ and supplied to the adders 66 and 67 where $\delta_c(n)=\cos(\pi n/N)$ and $\Gamma_s(n)=\sin(\pi n/N)$. The output of the adder 66 is connected to the delay 68 and the output of the delay 68 is $\tilde{x}_r(n,t)$. The output of the adder 67 is connected to the delay 69 and the output of the delay 69 is $\tilde{x}_i(n,t)$, wherein $\tilde{x}_i(n,t)$ is namely $\tilde{x}_i(n,t+1)$. Said $\tilde{x}_i(n,t+1)$ is supplied to the multipliers 64 and 62, respectively, for multiplying with $\Gamma_c(n)$ and $\Gamma_s(n)$ and supplied to the adders 67 and 66. The outcomes of MDCT(n) and MDST(n) can be retrieved from the output of adders 66 and 67.

Figure 7:
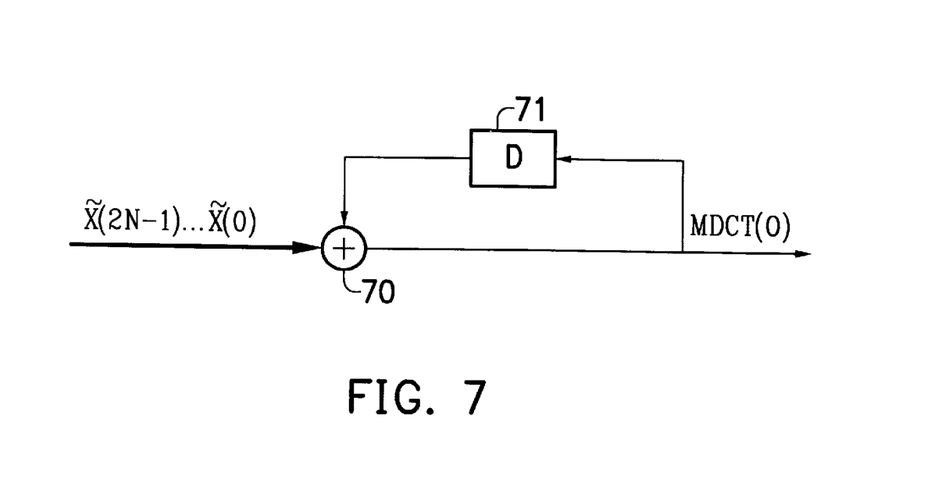
FIG. 7 is a detailed circuit diagram showing the special module SC2 of FIG. 5.

However, since the calculation of $\tilde{x}(0)$ can be simplified as equation 21), the special module SC2 circuit is as shown in FIG. 7. Said special module SC2 includes: an adder 70 and a delay 71. It can be known from equation (21), the calculation of MDCT(0) needs only to feed $\tilde{x}(0), \tilde{x}(1), \ldots, \tilde{x}(2N-1)$ supplied to the adder 70 through the output of the adder 41 to the delay 43 for adding up those $\tilde{x}(0), \tilde{x}(1), \ldots, \tilde{x}(2N-1)$ and then outputting the calculated outcomes of MDCT(0). Basically, the special module SC2 is an accumulator.

The Analysis of Circuit Complexity

In the following the parallel lattice architecture of Fast Fourier Transform of the present invention will be compared with the butterfly structure realized with conventional Cooley-Tukey theory. A 2N-point Fast Fourier Transform realized with a butterfly structure will include $\log_2(2N)$ stages, each stage will require N multipliers and 2N adders. Since input data are composed of complex-valued data, the multiplication operation of each complex-valued data will require four real multipliers and two real adders. Therefore, a Fast Fourier Transform device realized with a butterfly structure will require $(4N\log_2 2N)$ real multipliers and $(6N\log_2 2N)$ real-number adders in total.

In accordance with this invention, the I-FFT is divided into two real transform circuits (namely, MDCT and MDST) and the I-FFT circuit can be realized with only real number operand. As shown in FIG. 2, the special module SC1 includes two adders, whereas each of the (N−1) lattice modules $IM_1$ to $IM_{N-1}$ includes four real multipliers and three real adders. Besides, the complete I-FFT module 2 will further need additional 2(N−1) adders, (N−1) multiplexers and 2(N−1) R type registers, that is, 4(N−1) real multipliers and [5(N−1)+2] real adders in total. The F-FFT is as shown in FIG. 5. The special module SC2 is an accumulator, the entire F-FFT module 5 will need 4(N−1) real multipliers and [3(N−1)+1] real adders.

The following Tables 1 and 2 show a comparison table of the parallel lattice architecture among the conventional Butterfly structure (prior art 1), "The quick Fourier transform: An Fast Fourier Transform based on symmetries" by H. Guo et al. in *IEEE Trans. Signal Processing* (Vol. 46, No. 2, pp. 335–341, Feb. 1998)(prior art 2), and the present invention in terms of 2N point Fast Fourier Transform device, wherein Table 1 is a comparison table of multipliers, and Table 2 a comparison table of adders.

TABLE 1

| | I-FFT | | | F-FFT | | |
|---|---|---|---|---|---|---|
| N | Prior Art 1 | Prior Art 2 | The Invention | Prior Art 1 | Prior Art 2 | The Invention |
| 256 | 9216 | 3202 | 1020 | 9216 | 1601 | 1020 |
| 512 | 20480 | 7426 | 2044 | 20480 | 3713 | 2044 |
| 1024 | 45056 | 16898 | 4092 | 45056 | 8449 | 4092 |
| 2048 | 98304 | 37890 | 8188 | 98304 | 18945 | 8188 |
| 4096 | 212992 | 83970 | 16380 | 212992 | 41985 | 16380 |
| 8192 | 458752 | 184322 | 32764 | 458752 | 92161 | 32764 |

TABLE 2

| | I-FFT | | | F-FFT | | |
|---|---|---|---|---|---|---|
| N | Prior Art 1 | Prior Art 2 | The Invention | Prior Art 1 | Prior Art 2 | The Invention |
| 256 | 13824 | 15100 | 1277 | 13824 | 6530 | 766 |
| 512 | 30720 | 33788 | 2557 | 30720 | 14850 | 1534 |
| 1024 | 67584 | 74748 | 5117 | 67584 | 33282 | 3070 |
| 2048 | 147456 | 163836 | 10237 | 147456 | 73730 | 6142 |
| 4096 | 319488 | 356348 | 20477 | 319488 | 161794 | 12286 |
| 8192 | 688128 | 770044 | 40957 | 688128 | 352258 | 24574 |

To summarize, the invention provides with a Fast Fourier Transform device suitable for DMT system realized as a VLSI circuit. According to this invention, I-FFT/F-FFT functions are modified to avoid the complex-valued operations. Moreover, this invention utilizes a time-recursive parallel lattice structure to reduce the complexity in required hardware for the I-FFT/F-FFT. Taking 512 (N=256) points, for example, the required multipliers is only 11% of those of the prior art, and the required adders 9% of those of the prior art. This practice is the best resolution for reducing manufacturing cost for an orthogonal frequency division multiplexing (OFDM) or transceiver system.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A Fast Fourier Transform device comprises:

an I-FFT module for converting x(n)(N=0, 1, ..., N−1) into X(k)(K=0, 1, ..., 2N−1), said x(n) are inputted into said I-FFT module by the real part $x_r(n)$ and imaginary part $x_i(n)$, respectively, said I-FFT calculating a MDCT(k) function and a MDST(k) function, and adding said corresponding MDCT(k) function and MDST(k) function up to be said X(k), wherein $$MDCT(k) = \sum_{n=0}^{N-1} x_r(n)\cos\frac{2\pi nk}{2N},$$

and $$MDST(k) = \sum_{n=0}^{N-1} x_i(n)\sin\frac{2\pi nk}{2N};$$

and a F-FFt module for receiving said X(k) and calculating a MDCT(n) function and a MDST(n) function, and combining said corresponding MDCT(n) function and MDST(n) function to be said x(n), wherein $$MDCT(n) = \sum_{k=0}^{2N-1} X(k)\cos\frac{2\pi nk}{2N},$$

and $$MDST(n) = \sum_{k=0}^{2N-1} X(k)\sin\frac{2\pi nk}{2N}.$$

2. The Fast Fourier Transform device of claim 1, wherein said I-FFT module comprises:

a first MDCT/MDST module array for receiving said real part $x_r(n)$ and said imaginary part $x_i(n)$, respectively, thereby calculating and then outputting said MDCT(k) function and MDST(k) function;

a plurality of multiplexers, each of said multiplexers receiving a pair of said corresponding MDCT(k) function and MDST(k) function, and switches one of said MDCT(k) function and MDST(k) function as advance output and the other as later output;

a plurality of adders, each of said adders connected to one of said multiplexers, respectively; and a plurality of registers, each of said registers connected to one of said adders, respectively; said advance output of said MDCT(k) function and MDST(k) function being first stored in said corresponding register, said later output of said MDCT(k) function and MDST(k) function being added up with the said advance output and then outputted.

3. The Fast Fourier Transform device of claim 2, wherein said first MDCT/MDST module array is realized with a time-recursive parallel lattice architecture.

4. The Fast Fourier Transform device of claim 3, wherein said first MDCT/MDST module array simplifies MDCT(0) as $$\sum_{n=0}^{N-1} x_r(n)$$

and simplifies MDCT(N) as $$\sum_{n=0}^{N-1} (-1)^n x_r(n).$$

5. The Fast Fourier Transform device of claim 4, wherein the number of said multiplexers is (N−1) since MDCT(k)= MDCT(2N−k) and MDST(k)=−MDST(2N−k).

6. The Fast Fourier Transform device of claim 5, wherein said I-FFT module comprises 2(N−1) said adders and 2(N−1) said registers.

7. The Fast Fourier Transform device of claim 2, wherein said I-FFT module further comprises 2N left shift registers for shifting said registers one bit to the left.

8. The Fast Fourier Transform device of claim 2, wherein said F-FFT module comprises a second MDCT/MDST module array for receiving said X(k) thereby calculating and then outputting said MDCT(n) function and MDST(n) function.

9. The Fast Fourier Transform device of claim 8, wherein said second MDCT/MDST module array is realized with a time-recursive parallel lattice architecture.

10. The Fast Fourier Transform device of claim 8, wherein said second MDCT/MDST module array simplifies MDCT (0) as $$\sum_{k=0}^{2N-1} X(k).$$

11. The Fast Fourier Transform device of claim 10, wherein said F-FFT module further comprises (2N−1) right shift registers for shifting said MDCT(n) function and MDST(n) function $\log_2(2N)$ bits to the right, respectively.

12. The Fast Fourier Transform device of claim 11, wherein said x(n) is $$\frac{1}{2N}[MDCT(n) + jMDST(n)].$$

* * * * *